(12) United States Patent
Tsai et al.

(10) Patent No.: US 7,118,263 B2
(45) Date of Patent: Oct. 10, 2006

(54) DIRECT BACKLIGHT MODULE

(75) Inventors: Yi-Shiuan Tsai, Kaohsiung (TW); Hui-Kai Chou, Taipei (TW)

(73) Assignee: AU Optronics Corp., Hsinchu (TW)

( * ) Notice: Subject to any disclaimer, the term of this patent is extended or adjusted under 35 U.S.C. 154(b) by 96 days.

(21) Appl. No.: 10/781,286

(22) Filed: Feb. 17, 2004

(65) Prior Publication Data

US 2005/0024891 A1 Feb. 3, 2005

(30) Foreign Application Priority Data

Aug. 1, 2003 (TW) .............................. 92121099 A

(51) Int. Cl.
*F21V 7/04* (2006.01)
(52) U.S. Cl. .................. 362/558; 362/632; 362/634; 349/112
(58) Field of Classification Search ................ 349/112; 362/558
See application file for complete search history.

(56) References Cited

U.S. PATENT DOCUMENTS

| 6,902,300 | B1 * | 6/2005 | Lee ............................ 362/306 |
| 7,009,771 | B1 * | 3/2006 | Bourdelais et al. ......... 359/599 |
| 2002/0113924 | A1 * | 8/2002 | Saito et al. ................. 349/112 |
| 2006/0023472 | A1 * | 2/2006 | Liu et al. .................... 362/614 |
| 2006/0034090 | A1 * | 2/2006 | Chen et al. ................. 362/390 |

* cited by examiner

*Primary Examiner*—Renee Luebke
*Assistant Examiner*—Zahra I. Bennett
(74) *Attorney, Agent, or Firm*—Thomas, Kayden, Horstemeyer & Risley

(57) ABSTRACT

A direct backlight module. The backlight module includes a diffuser, a reflecting plate, a plurality of light sources and at least one transparent support. The reflecting plate connects to the diffuser and forms a chamber therebetween. The plurality of light sources are disposed in the chamber. The transparent support is disposed in the chamber to support the diffuser and the reflecting plate.

8 Claims, 9 Drawing Sheets

DIRECT BACKLIGHT MODULE

BACKGROUND OF THE INVENTION

1. Field of the Invention

The present invention relates to a direct backlight module and in particular to a direct backlight module to overcome flexing of a diffuser and light sources.

2. Description of the Related Art

FIG. 1 is conventional direct backlight module 1 disclosed in Japanese Patent Publication No. 5-119703. The conventional backlight module 1 places a support 13 under an illumination tube 14 to overcome deformation thereof. Nevertheless, the size of the LCD panel (not shown) increases, the diffuser 11 must also be larger. The diffuser 11 is thus bent and deformed due to the heat from the illumination tube 14, thereby impacting the optics of the direct backlight module 1.

Therefore, as shown in FIG. 2, in order to prevent flexing, several supports 23 are disposed between the reflecting plate 12 and the diffuser 11. Thus, the optical character of the direct backlight module 1 is not affected and the illumination tubes 14 are not damaged by the flexed diffuser 11. Nevertheless, as size of the LCD panel increases, the number of the supports 23 also increases. The supports 23 always partially obscure light affecting uniformity of the display.

SUMMARY OF THE INVENTION

In order to address the disadvantages of the aforementioned backlight module, the present invention provides a direct backlight module utilizing a transparent support to prevent diffuser deformation.

The direct backlight module of the present invention includes a diffuser, a reflecting plate, a plurality of light sources and at least one transparent support. The reflecting plate connects to the diffuser and forms a chamber therebetween, in which the light sources and transparent support are disposed. The transparent support supports the diffuser and the reflecting plate.

The transparent support includes a retaining portion and connected supporting plate and is disposed between the diffuser and the reflecting plate.

The supporting plate contacts the diffuser and the retaining portion connects to the reflecting plate.

The retaining portion and the supporting plate are integrally formed.

The transparent support is manufactured by injection molding.

The supporting plate is a hollow frame.

The plurality of light sources are lamps.

The transparent support comprises a plurality of supporting units.

The plurality of supporting units in the chamber are arranged in array.

The plurality of supporting units in the chamber are arranged in concentric circles.

Each supporting unit has a retaining portion and connected supporting plate and is disposed between the diffuser and the reflecting plate.

The supporting plate contacts the diffuser and the retaining portion connects to the reflecting plate.

The retaining portion and the supporting plate are integrally formed.

The transparent support is manufactured by injection molding.

The plurality of supporting units are hollow frames.

The transparent support comprises a diffusion material.

A diffusion material is coated on the at least one transparent support.

DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
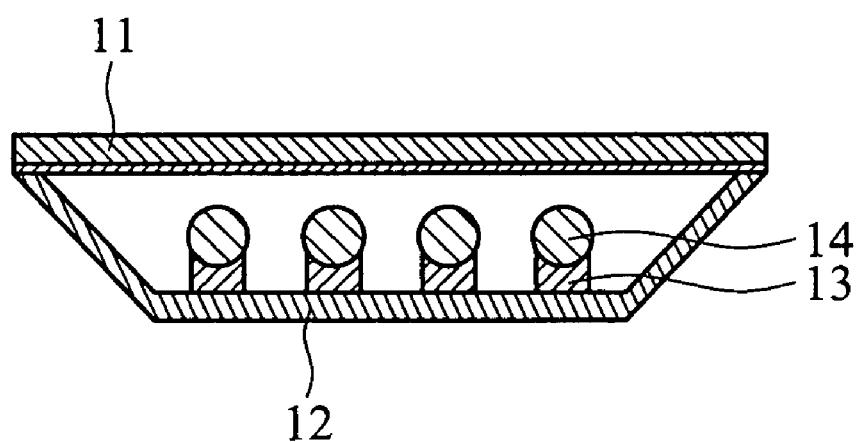
FIG. 1 is a sectional view of a conventional direct backlight module.
Figure 2:
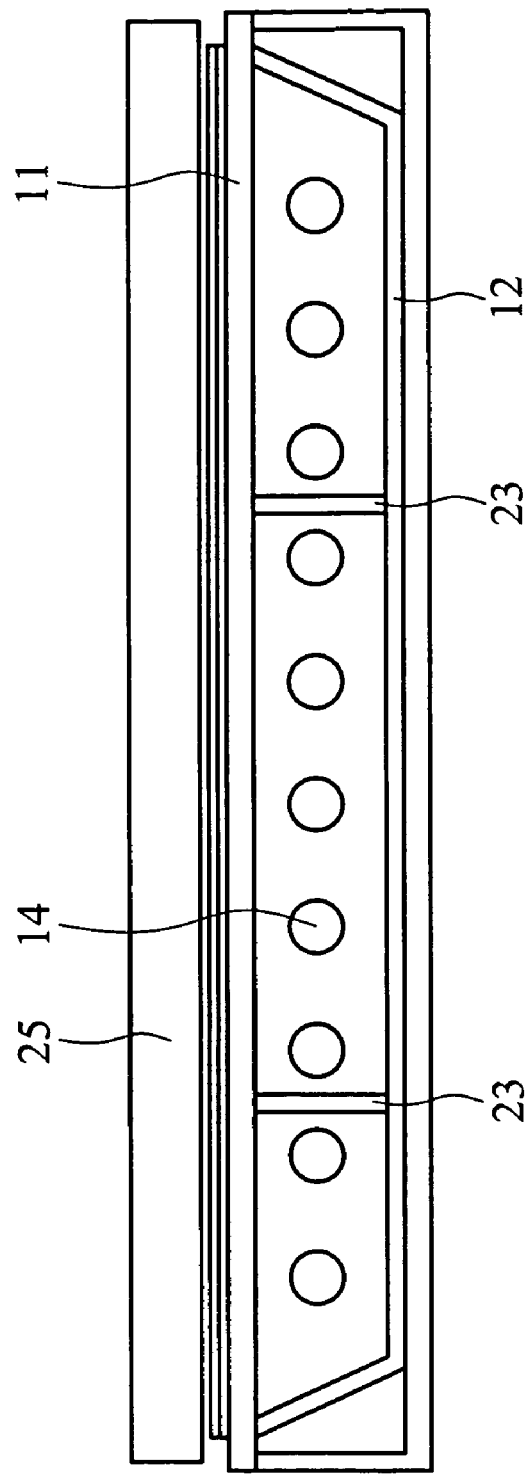
FIG. 2 is a sectional view of another conventional direct backlight module.
Figure 3:
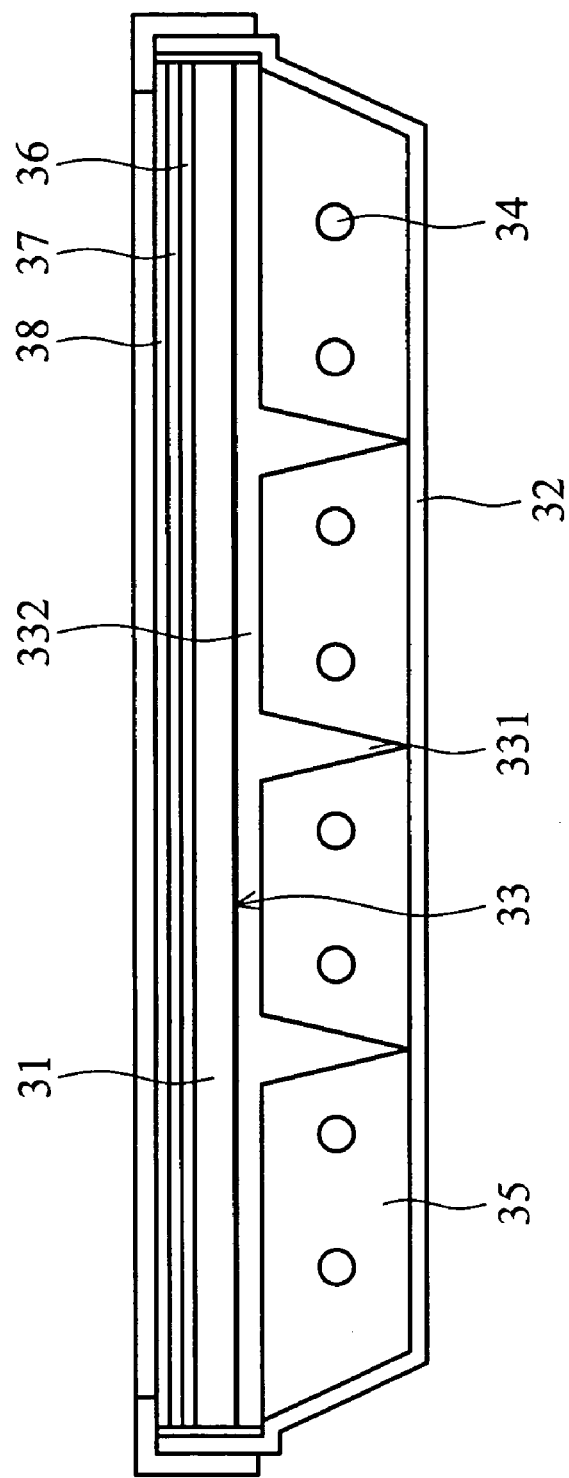
FIG. 3 is a sectional view of a first embodiment in accordance with the present invention.

FIG. 3 shows a sectional view of a first embodiment in accordance with the present invention, in which a direct backlight module 3 has a diffuser 31 connected to a reflecting plate 32. A chamber 35 is formed between the diffuser 31 and the reflecting plate 32. In the chamber 35, a plurality of light sources 34 are disposed. In this embodiment, the plurality of light sources 34 are lamps. In order to overcome deformation of the diffuser 31 due to the size of the diffuser 31 and the heat from the light sources 34, a transparent support 33 is disposed between the diffuser 31 and the reflecting plate.

In the embodiment, the transparent support 33 is integrally formed by injection molding, comprising several retaining portions 331 connected to a supporting plate 332. The flat supporting plate 332 fixes and retains the shape of the diffuser 31. The retaining portions 331 are arranged between the light sources 34 according to diffusion requirements, supporting the supporting plate 332 and the diffuser 31. The transparent supports 33 comprise transparent material to not affect the brightness of the backlight module. To further aid optical uniformity, the transparent supports 33 may also comprise diffusion material or such may be coated on the surface thereof.

Furthermore, a first diffuser plate 36, a prism 37 and a second diffuser plate 38 are disposed on the diffuser 31. The first diffuser plate 36 is disposed on the diffuser 31, the prism 37 is disposed on the first diffuser plate 36, and the second diffuser plate 38 is disposed on the prism 37, with amounts and sequences of disposition dictated by demand.

Figure 4A:
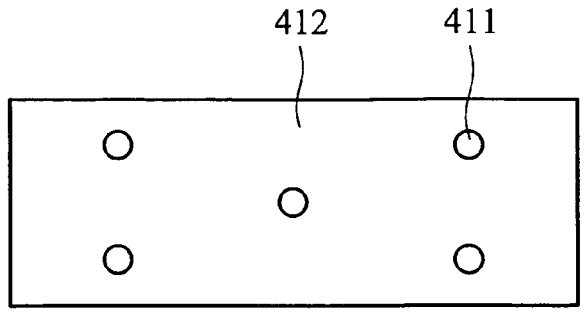
FIGS. 4a–4c are top views of a first type transparent support in accordance with the first embodiment of the present invention.
Figure 4B:
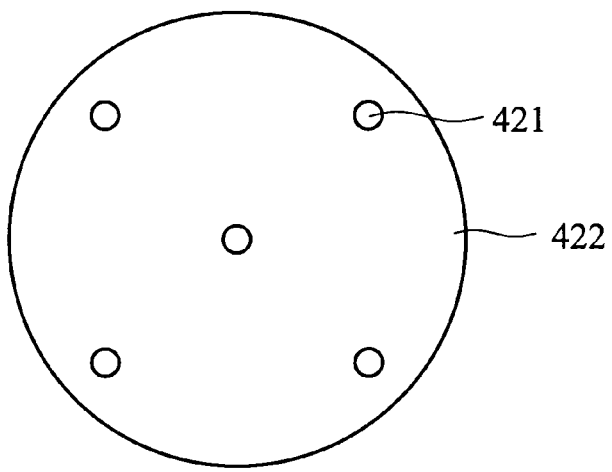
Figure 4C:
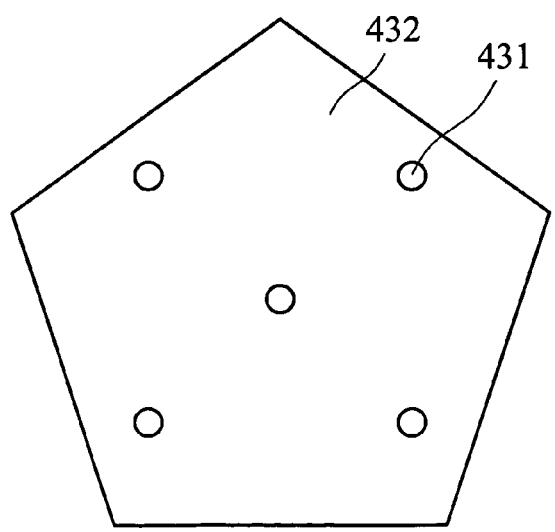

FIGS. 4a to 4c show top views of a first type of transparent supports. The supporting plates 412, 422 and 432 of the transparent supports 41, 42 and 43 are respectively rectangular, circular and polygonal. The supporting plates 412, 422 and 432 are integrated with the retaining portions 411, 421 and 431 arranged thereunder. Shape of the supporting plates may be designed according to the diffuser used. The area of the transparent supports may be reduced to support the diffuser. Retaining portion numbers vary with demand. For example, the transparent support 42 with circular supporting plate 422, as shown in FIG. 4b, has only one retaining portion disposed at the center of the supporting plate 422.

Figure 5A:
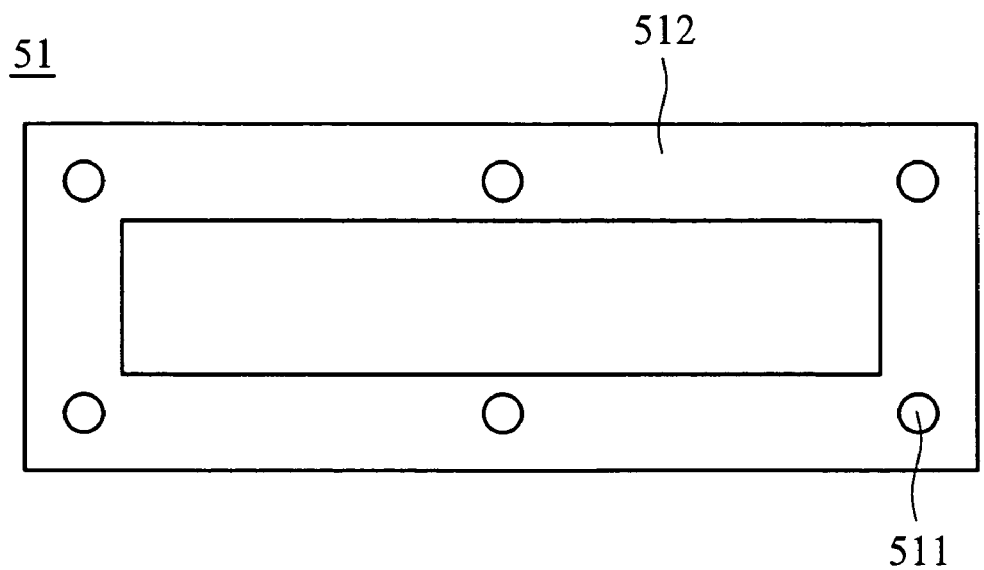
FIGS. 5a–5b are top views of a second type transparent support in accordance with the first embodiment of the present invention.
Figure 5B:
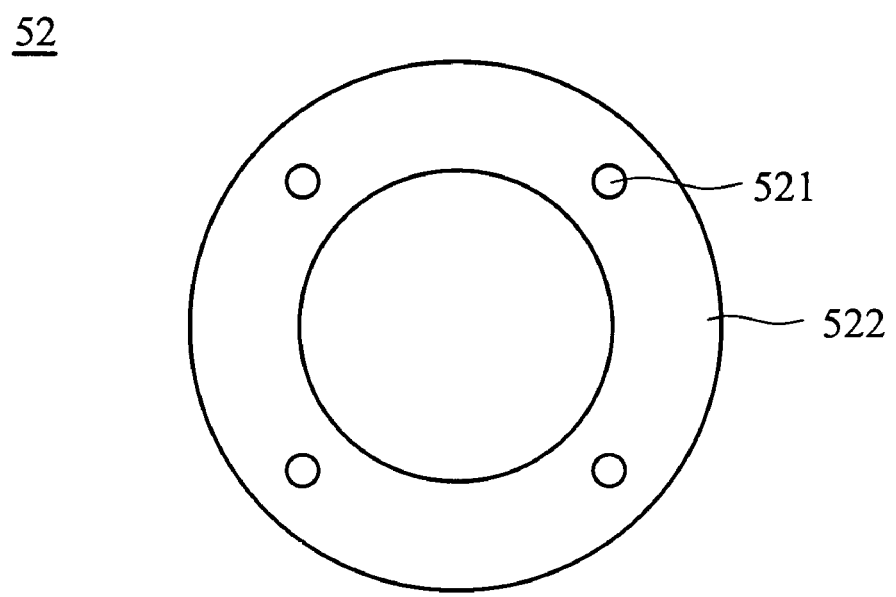

FIGS. 5a to 5b show top views of a second type of transparent supports. FIGS. 5a to 5b, the supporting plates 512 and 522 of the transparent supports 51 and 52 are, respectively, rectangular and circle hollow frames. The retaining portions 511 and 521 are arranged under the supporting plates 512 and 522. Shape of the supporting plates can vary according to the diffuser. The design of the hollow frame can reduce the area of the transparent supports and decrease the overall weight of the direct backlight module while supporting the diffuser. A majority of light is directly emitted into the diffuser without passing through the supports, such that brightness of the direct backlight module is more uniform.

Figure 6A:
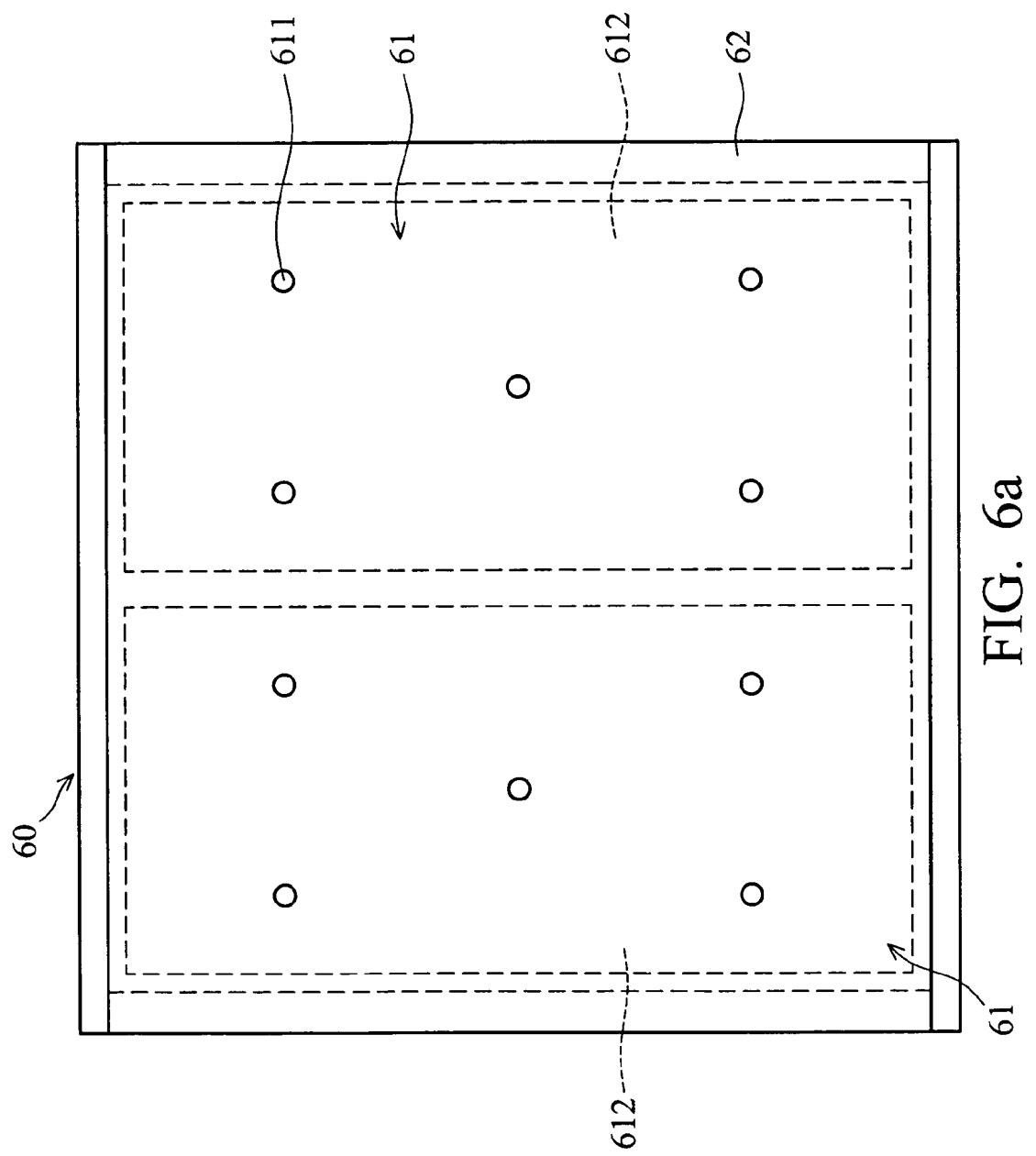
FIGS. 6a–6b are top views of a second embodiment in accordance with the present invention.
Figure 6B:
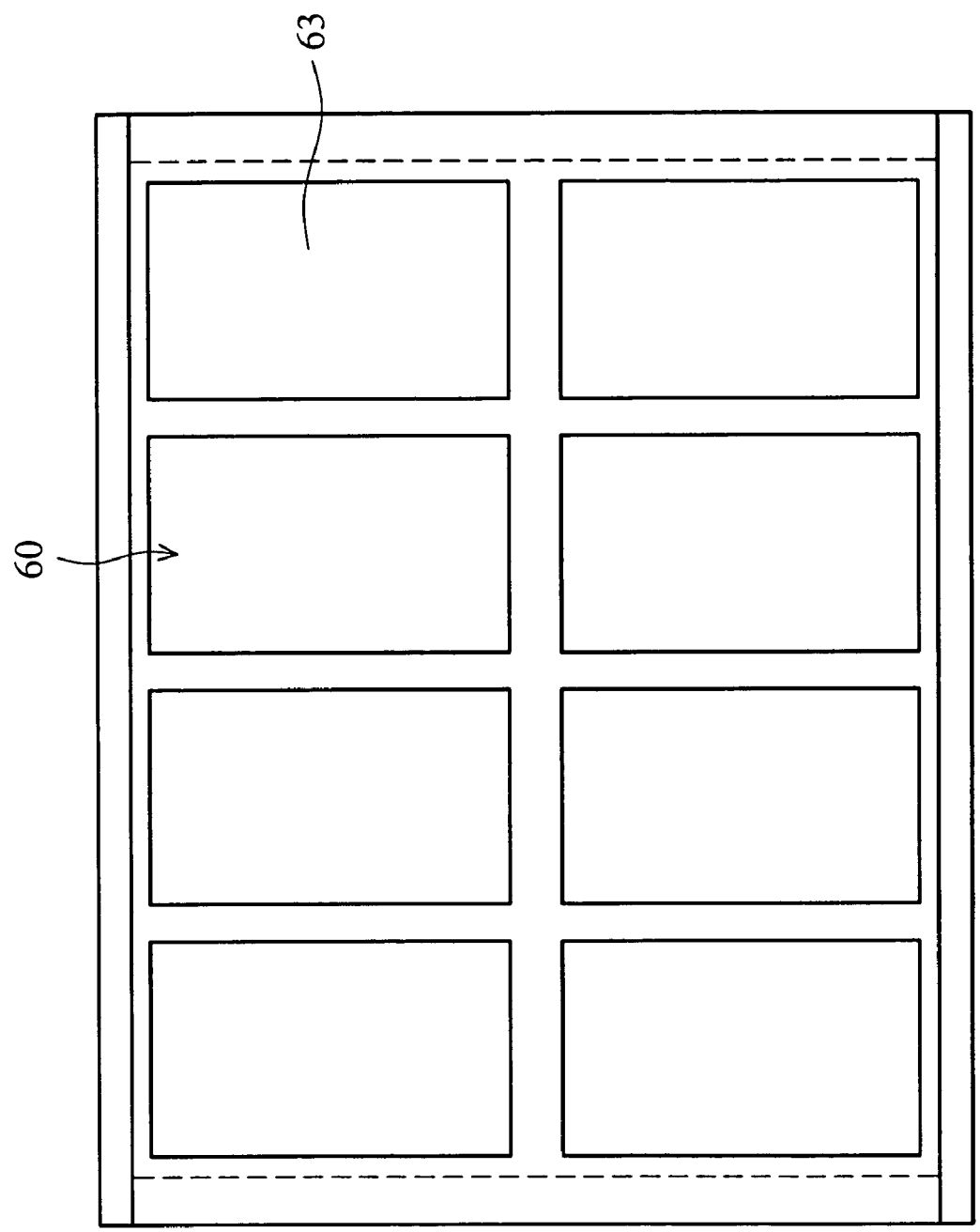

In the present invention, the transparent supports are not limited to an integral type, and may be combined with several supporting units. FIGS. 6a to 6b are top views of a second embodiment of a direct backlight module in accordance with the present invention. In FIG. 6a, the transparent support 60 of the direct backlight module 6 comprises two supporting units 61. Each supporting unit 61 is formed by retaining portions 611 and a supporting plate 612. The retaining portions 611 contact the reflecting plate (not shown), and the supporting plate 612 contacts the diffuser 62. The supporting units 61 are arranged in array to support the diffuser. FIG. 6b shows small-scale supporting units 63 arranged in array. The transparent support formed by the small-scale supporting units not only supports the diffuser but can also be conveniently transported. Further, the small-scale supporting units can vary with the size of the panel with the direct backlight module to reduce costs.

Figure 7A:
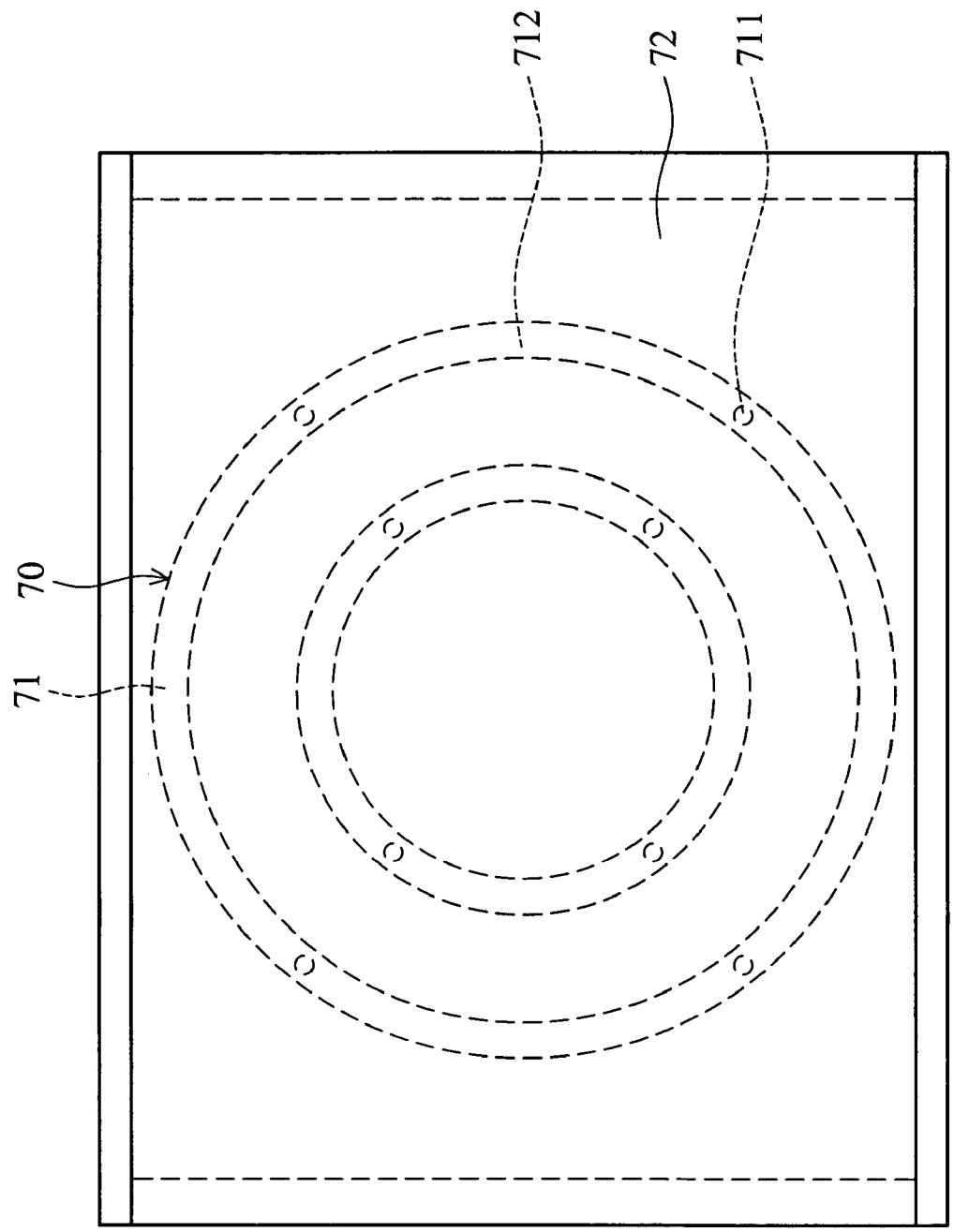
FIGS. 7a–7b are top views of a third embodiment in accordance with the present invention.
Figure 7B:
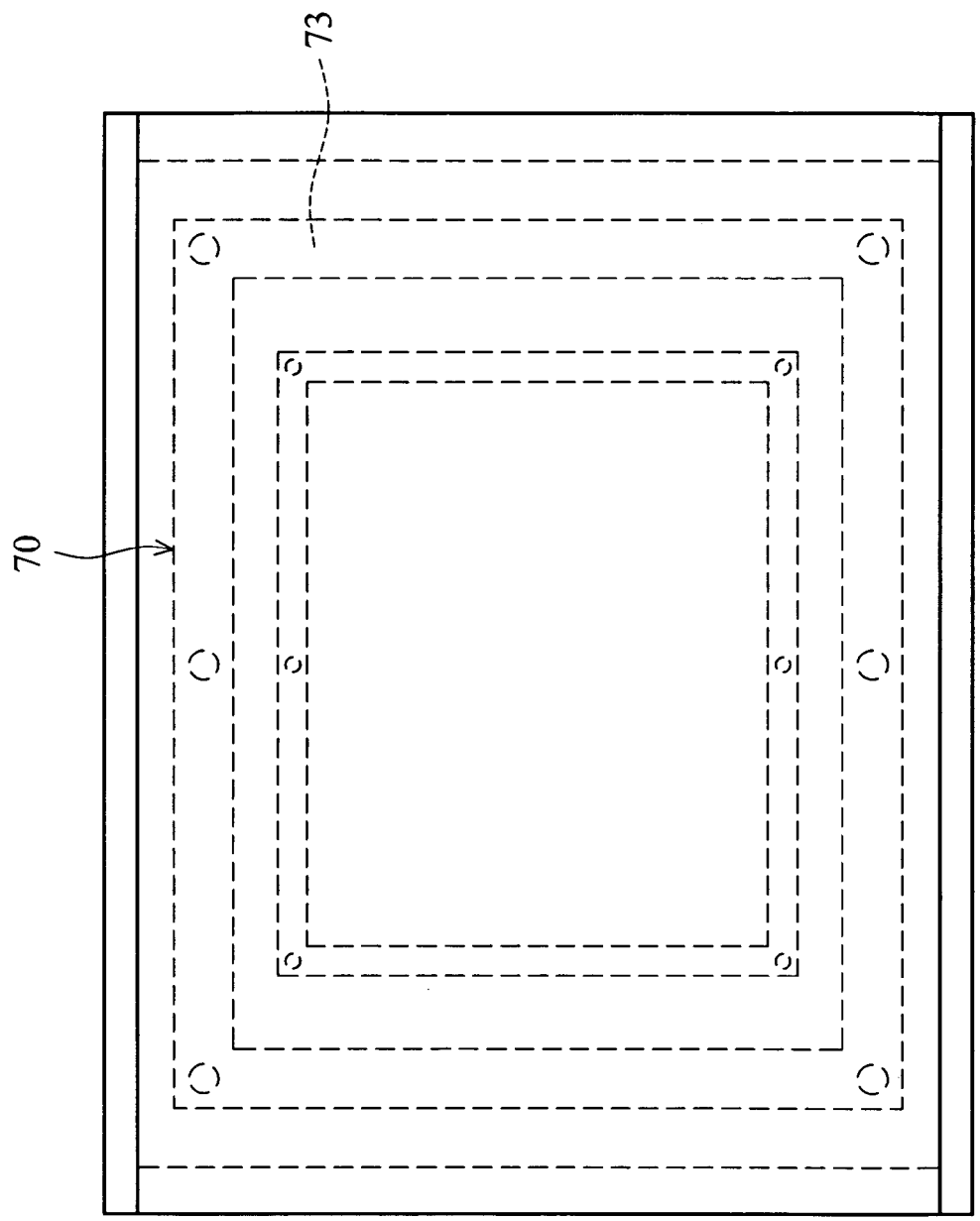

In the present invention, the transparent supports are not limited to an integral type, and may be combined with several different sizes of supporting units. FIGS. 7a to 7b are top views of a third embodiment of a direct backlight module in accordance with the present invention. In FIG. 7a, the transparent support 70 of the direct backlight module 7 comprises two supporting units 71 arranged in concentric circles. Each supporting unit 71 is formed by retaining portions 711 and a supporting plate 712, a hollow frame. The retaining portions 711 contacts the reflecting plate (not shown), and the supporting plate 712 contacts the diffuser 72. The supporting units 71 are arranged in concentric circles to support the diffuser. In FIG. 7b, the supporting units 73 constituting a transparent support 70 are arranged homocentrically. The transparent support 70 comprising the different sizes of supporting units 73 supports the diffuser and prevents deformation thereof. Further, the hollow design of the supporting plate not only reduces the area of the transparent supports but also weight of the direct backlight module 7. A majority of light is directly emitted into the diffuser without passing through the supports, such that brightness of the direct backlight module is more uniform.

According to the present invention, the transparent supports prevent the diffuser from deformation irrespective of the size thereof, affecting brightness.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A direct backlight module comprising:
   a diffuser;
   a reflecting plate connected to the diffuser and forming a chamber therebetween;
   a plurality of light sources disposed in the chamber; and
   at least one transparent support disposed in the chamber to support the diffuser and the reflecting plate, wherein the at least one transparent support includes a retaining portion and a supporting plate abutting the diffuser, and the retaining portion extends from the supporting plate to the reflecting plate.

2. The direct backlight module as claimed in claim 1, wherein the supporting plate contacts the diffuser and the retaining portion connects the reflecting plate.

3. The direct backlight module as claimed in claim 1, wherein the retaining portion and the supporting plate are integrally formed.

4. The direct backlight module as claimed in claim 3, wherein the at least one transparent support is manufactured by injection molding.

5. The direct backlight module as claimed in claim 1, wherein the supporting plate is a hollow frame.

6. The direct backlight module as claimed in claim 1, wherein the plurality of light sources are lamps.

7. The direct backlight module as claimed in claim 1, wherein the at least one transparent support comprises a diffusion material.

8. The direct backlight module as claimed in claim 1, further comprising a diffusion material coated on the at least one transparent support.

* * * * *